Aug. 15, 1933.    O. C. SCHMIDT    1,922,263
SMOKE STICK
Filed Jan. 15, 1932
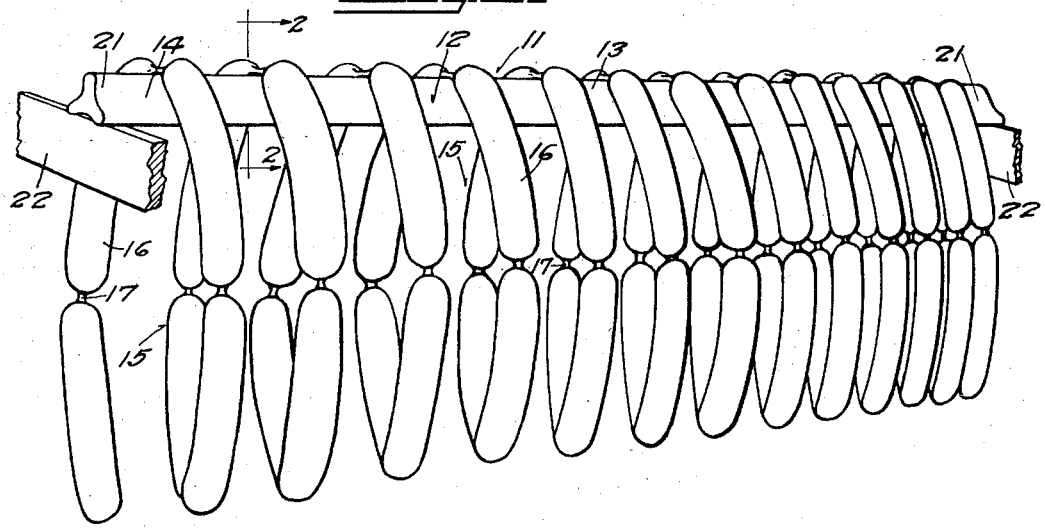
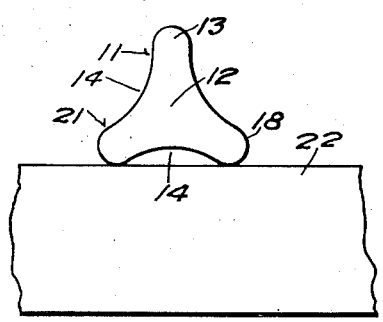
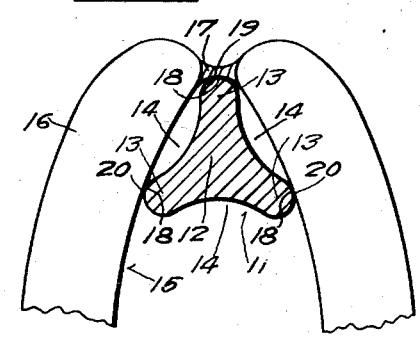
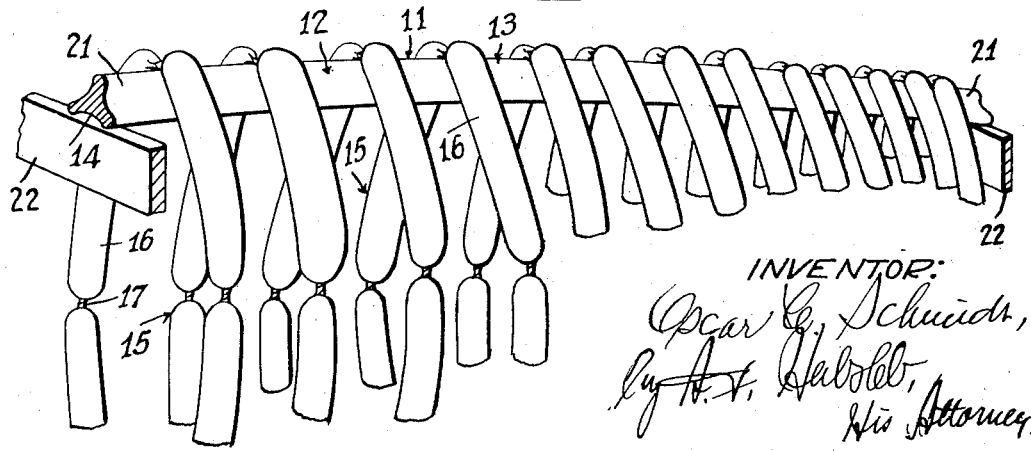

Patented Aug. 15, 1933

1,922,263

UNITED STATES PATENT OFFICE 1,922,263

SMOKE STICK

Oscar C. Schmidt, Cincinnati, Ohio, assignor to The Cincinnati Butchers' Supply Company, Cincinnati, Ohio, a Corporation of Ohio Application January 15, 1932. Serial No. 586,758

1 Claim. (Cl. 99—2)

My invention relates to smoke-sticks. It is the object of my invention to provide a smoke-stick which is economical to manufacture and which permits exposure of a maximum area of the outer periphery of the sausages suspended thereon to the direct action of the heat and smoke in smoking the sausage.

In usual practice linked sausages are hung upon wooden smoke-sticks which are round in cross-section, the sausages being looped about and suspended from the smoke-sticks in such manner that the inner faces of the upper ends of the links rest upon the solid outer circumferences of the sticks, and thereby prevent action of the heat and smoke of the smoking upon those portions of such inner faces which so rest against the stick, forming in practice the well-known pale or white blotches at one of the sides of the ends of linked sausages. These resting portions are not cooked or smoked at all or are cooked and smoked to substantially less extent than the balance of the sausages, and form substantially moon-shaped areas at which deterioration of the sausages first begins.

It is the object of my invention to avoid these objections, and to provide a smoke-stick which properly supports linked sausage looped upon the smoke-stick in conventional manner, but is of such cross-sectional form as to reduce the area of contact between the sausages and the smoke-stick to the minimum.

It is a further object of my invention to provide a non-metallic smoke-stick which is cross-sectionally solid and is provided with ribs extending lengthwise of the smoke-stick for supporting the sausages and having spaces between the ribs, for exposing the portions of the sausages between their supported lines to the direct heat and smoke of the smoking of the sausages, permitting the heat and smoke to attack and permeate all portions of the sausages.

I prefer that the smoke-sticks shall be of wood or at least non-metallic, as it has been found in practice that a metal smoke-stick absorbs and retains the heat of the smoking and tends to burn or scorch the portions of the sausage contacting the same.

It is the object of my invention further to provide a cross-sectionally solid non-metallic smoke-stick having ribs extending lengthwise thereof in separated relations about the circumference of the smoke-stick for forming edge supports for the sausages having spaces therebetween through which the portions of the sausages between contact lines thereof with the ribs of the stick are exposed to the heat and smoke of the smoking, and whereby the ends of the ribs form supports for the sticks upon end supports in the smoke chamber and in handling and storing the sausages, the ribs being circumferentially so arranged that the stick may be rotated about its axis and supported with any of its sides uppermost without tipping, in order that, if the stick should become bent, it may be positioned upon its end supports with its bow or bend extending upwardly, whereby the weight of the sausages aids in straightening the stick.

The invention will be further readily understood from the following description and claim, and from the drawing, in which latter:

Fig. 1 is a perspective view of my improved smoke-stick having link sausages hung thereon and supported upon end supports, partly broken away.

Fig. 2 is a cross-section of my improved device, taken on the line 2—2 of Fig. 1, showing linked sausage hung thereover, and the relation of the latter to the ribs when supported on the smoke-stick, the sausages being partly broken away.

Fig. 3 is an end view of my improved device, showing an end of the smoke-stick supported on an end support, partly broken away.

Fig. 4 is a perspective view of my improved smoke-stick, showing the manner of supporting the same when warped, and having link sausages hung thereon, and shown partly broken away and partly in section.

The smoke-stick 11 comprises a body 12 which is preferably solid, and which has ribs 13 extending integrally therefrom in various angular directions. The smoke-stick is shown provided with three ribs. The ribs are arranged circumferentially in spaced relation about the body of the smoke-stick and extend lengthwise of the smoke-stick. They are preferably equidistant from each other.

There are peripheral spaces 14, between the ribs. Linked sausages, exemplified at 15, are hung upon the smoke-stick. In practice a suitable number of smoke-sticks with linked sausages hung thereon are placed in a smoke-chamber or smoke-oven of suitable character and provided with heat and fumes for smoking the sausages, the sausages being exposed therein to the heat and smoke of the smoking of the sausages.

With my improved device, the links 16 of the sausages, having the joints 17 therebetween, are hung on the smoke-stick, with the joints above the smoke-stick and the sausage-links suspended thereon.

In my improved form of smoke-stick, the outer edges 18 of the ribs form contact lines for the sausages, such contact lines extending lengthwise of the smoke-stick in separated relations.

In employing the form of smoke-stick shown, the joints 17 between the links rest, by a contact line 19, upon the upper edge of the upper rib of the smoke-stick, and contact lines 20 only of the inner faces of the upper ends of the links of the sausages rest upon the outer edges of the lower ribs.

The spaces 14 between the ribs are between said contact lines, the body of the smoke-stick receding from the portions of the sausages between said contact-lines, forming spaces or passages in which the heat and smoke of the smoking attacks such portions of the sausages. The entire face of the sausage, except for such narrow contact-lines, is exposed to the direct heat of the smoking, and such contact lines are so narrow that the heat and smoke permeates the sausages across the contacted portions for imparting a uniform smoking to the entire sausages.

The lower ribs are at the lower edges of the smoke-stick and form separating means at the lowermost portion of the stick between the links at the respective sides of the stick for preventing contact between said links.

My improved smoke-stick is further non-metallic, being preferably wood, so as not to absorb heat from the smoking and thereby detrimentally affect the contacted parts of the sausages. My improved smoke-stick is preferably formed out of a single piece of wood at a single operation.

The ends 21 of the smoke-stick rest upon end supports 22, the ends of the lower ribs resting upon such end supports for preventing tipping or rotating of the smoke-stick while the sausages are hung thereon. The smoke-stick may, however, be rotated about its axis when positioning the same for hanging the sausages thereon, for presenting any two of its ribs to such end supports, in order that the smoke-stick may be so arranged upon the end supports as to present any desired rib thereof upwardly.

Smoke-sticks of this character are subjected to heat and to cooling action and are cleansed by being immersed in hot water and subjected to other actions which tend to warp the smoke-sticks, the warping being also accentuated by the weight of the sausages. In case a smoke-stick is warped, the arrangement of the ribs permits the smoke-stick to be supported on its end supports with its bow presented upwardly, as exemplified in Fig. 4, without tipping, so that, when the sausages are suspended thereon, the weight of the sausages tends to restore the smoke-stick to straight condition.

The ribs are equidistantly arranged about the circumference of the smoke-stick, so that the smoke-stick is supported by the respective ends of its lower ribs resting upon the end supports, and has its upper rib in the same upper positions with relation to the stick, regardless of which side of the stick is presented downwardly, so that the joints between links are similarly arranged upon the sticks and the links hang similarly at the respective sides of the stick regardless of which side of the stick is uppermost.

Having thus fully described my invention, what I claim as new, and desire to secure by Letters Patent, is:

A cross-sectionally solid non-metallic smoke-stick formed with a plurality of spaced-apart ribs arranged radially about the smoke-stick and extending lengthwise thereof to form separated contact lines for the sausages suspended thereon, said ribs being equi-distant about said smoke-stick so that any two of said ribs act as resting points for the smoke-stick on end supports with the portions of said smoke-stick between said last-named ribs spaced from said end supports, for exposing all portions of the smoke-stick, of the sausages and of the end supports between all ribs to the direct heat and smoke of the smoking of the sausages, and arranged so that any of said ribs may be directed upwardly in resting the smoke-stick on others of said ribs on end supports, in order that the bow of any warp in the smoke-stick may be arranged upwardly for counteracting said warp by the weight of the sausages during the smoking of said sausages.

OSCAR C. SCHMIDT.